June 2, 1959 S. LUBKIN ET AL 2,889,548

SIGNAL GENERATOR

Filed Dec. 17, 1954 5 Sheets-Sheet 1

INVENTORS.
SAMUEL LUBKIN
EUGENE LEONARD
BY S.C. Yuter
ATTORNEY.

INVENTORS.
SAMUEL LUBKIN
EUGENE LEONARD
BY S.C. Yuter
ATTORNEY.

INVENTORS.
SAMUEL LUBKIN
EUGENE LEONARD
BY
ATTORNEY

GATE 122

GATE 122

BUFFER 146

BUFFER 146

INVENTORS.
SAMUEL LUBKIN
EUGENE LEONARD
BY S.C. Yuter
ATTORNEY.

DRUM READING AMPLIFIER 370

PULSE AMPLIFIER 190

PULSE AMPLIFIER 190

RESHAPER 228

INVENTORS.
SAMUEL LUBKIN
EUGENE LEONARD
BY S.C. Yuter
ATTORNEY

United States Patent Office 2,889,548

Patented June 2, 1959

2,889,548

SIGNAL GENERATOR

Samuel Lubkin, Bayside, and Eugene Leonard, Elmhurst, N.Y., assignors to Underwood Corporation, New York, N.Y., a corporation of Delaware Application December 17, 1954, Serial No. 475,922

6 Claims. (Cl. 340—345)

This invention relates to data processors and more particularly to methods and apparatus for storing and generating timing signals for electronic data processors.

Timing signals are used in modern electronic data processors to control sequences of operations and to control and synchronize the flow of data. Timing signals are further used as standard signals with which to standardize the timing and shape of signals which are generated to represent data. A common method of storing the data is to record it on a rotatable magnetic drum.

A magnetic drum is a cylindrically shaped body having a magnetizable surface. Electrical signals are stored as magnetic flux patterns on the magnetizable surface by magnetic transducing heads which are positioned adjacent to the surface of the drum. Each of the magnetic heads scans an area or "channel" on the surface of the drum as the drum is rotated on its axis. When an electrical signal is transmitted to a magnetic head, the signal causes flux to be generated in the head and causes the signal to be recorded in the adjacent portion of the channel on the drum. Control apparatus associated with each magnetic head causes the head to read signals from the drum when subsequently desired.

In order to use a magnetic drum for storing data such that the data can be subsequently located with a high degree of accuracy, it is necessary to store the data in known locations on the magnetic drum. A simple method of locating positions on the surface of a magnetic drum is to locate such positions with reference to a fixed point. Thus it has become the accepted practice in many modern data processors to record a single pulse in a selected channel on the surface of a magnetic drum. The single pulse acts as a reference point for locating positions on the surface of the drum. A series of pulses is also recorded on the drum to provide a source of timing signals.

Thus a signal is recorded in a first channel for supplying timing signals and a pulse is recorded in a second channel for providing a reference point on the surface of the magnetic drum. Heretofore these signals were recorded in separate channels. However, on a magnetic drum of given dimensions the number of channels available for the storing of signals is fixed. Therefore, the recording of timing and reference or "marker" pulse signals in separate channels reduces the number of channels which are available for storing data. Unfortunately, the reduction of data storage space directly affects the utility of data processors. Further, the equipment necessary to inspect the separate channels to convert the magnetic flux patterns to electrical signals is expensive and it is considered very desirable to reduce the amount of transducing equipment which is utilized in connection with the timing and marker pulse signals.

It is accordingly an object of the invention to provide an improved method of and apparatus for generating timing signals.

Another object of the invention is to provide a method of arranging signals on a magnetic drum whereby the number of channels required for generating timing and reference signals is reduced.

A further object of the invention is to provide a method for arranging signals whereby a single signal is stored to permit the simultaneous generation of two separate signals.

A further object of the invention is to provide an improved method of and apparatus for generating a plurality of signals.

Another object of the invention is to provide an improved method of and apparatus for generating a plurality of signals in response to a single signal which is recorded on a magnetic drum.

Briefly, one method of arranging signals in accordance with the invention comprises storing an incomplete series of pulses.

A signal generator in accordance with the invention comprises apparatus which responds to the incomplete series of pulses to produce a complete series of pulses and which responds to the absence of a pulse to produce a pulse.

The complete series of pulses may be used as timing pulses and a pulse generated from an absent pulse may be employed as a marker pulse.

The utility of the invention has been shown above in regard to the storage of magnetic signals in data processors. However, an advantage of the invention is that the principles thereof are applicable more generally to other problems of conserving signal storage space. Thus the invention is not limited to magnetic devices nor to data processing, but is useful in any field in which the generation of a plurality of signals from a single signal is useful.

Other advantages of the invention are that existing circuits can be easily modified in accordance therewith and that less apparatus is required for handling the timing and marker pulse signals.

Other objects and advantages of the invention will appear in the subsequent detailed description which is accompanied by drawings wherein.

Figure 8:
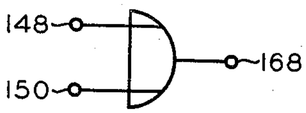
Fig. 8 shows the symbol for a buffer.
Figure 9:
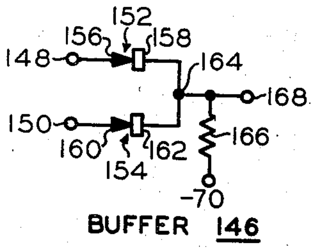

Fig. 9 pictures the schematic details of the circuit illustrated by the symbol of Fig. 8.

Figure 10:
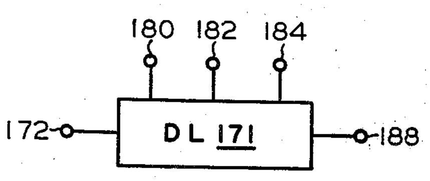

Fig. 10 shows the symbol for a delay line.

Figure 11:
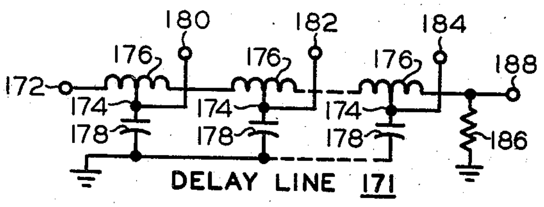

Fig. 11 is a schematic diagram of the delay line.

Figure 12:
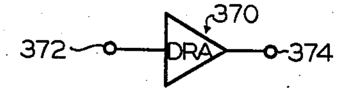

Fig. 12 illustrates the symbol for a drum-reading amplifier.

Figure 13:
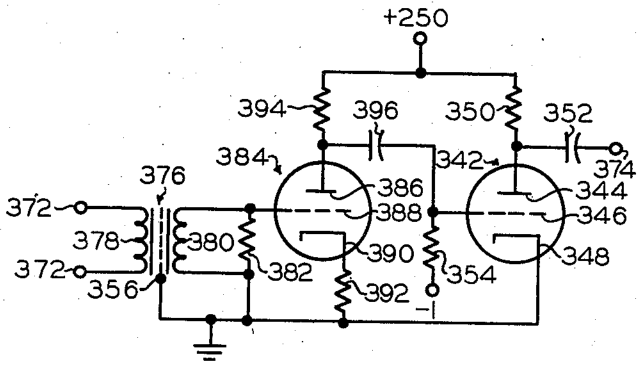

Fig. 13 is the schematic diagram of the circuit represented by the symbol of Fig. 12.

Figure 14:
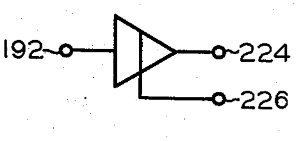

Fig. 14 illustrates the symbol for a pulse amplifier.

Figure 15:
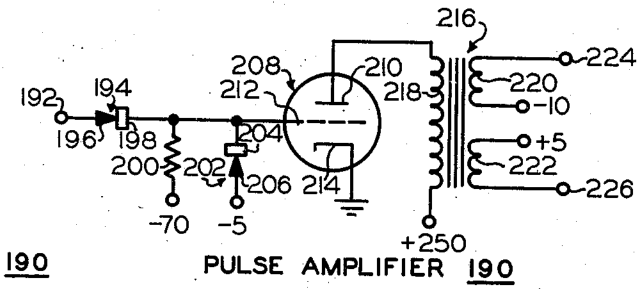

Fig. 15 is a schematic diagram of the circuit represented by the symbol of Fig. 14.

Figure 16:
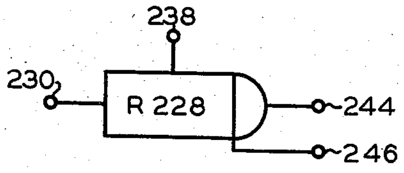

Fig. 16 illustrates the symbol for a reshaper.

Figure 17:
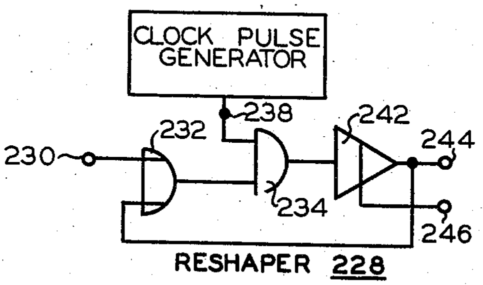

Fig. 17 shows the details of the circuit represented by the symbol of Fig. 16.

Figure 1:
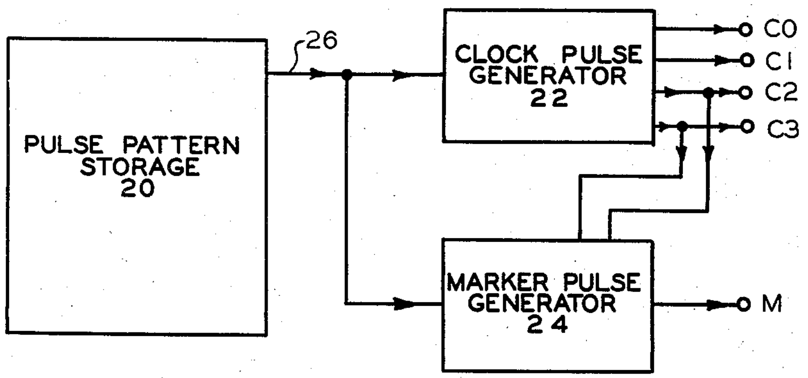
Fig. 1 is a block diagram of a preferred embodiment of the invention.

Referring now to the apparatus of Fig. 1, a signal device is shown in which a signal consisting of a chain of pulses is stored for the purpose of enabling the production of a plurality of different signals. The block diagram illustrates that the invention is not limited to magnetic storage in data processors.

The signal which is stored consists of $x-y$ ($x$ minus $y$) number of pulses. This signal results in one group of signals which each consists of $x$ number of pulses and a second signal which consists of $y$ number of pulses.

The signal device comprises the pulse pattern storage 20, a clock pulse generator 22 and a marker pulse generator 24. The signal is stored in the pulse pattern storage 20 as a series of pulses. Certain of the pulses are absent from the series. The pulses are all of the same time duration and occur at a given frequency. The signal is repeatedly transmitted from the pulse pattern storage 20 via a line 26 to the clock pulse generator 22 and the marker pulse generator 24.

The clock pulse generator 22 responds to the signal received via the line 26 by producing a group of signals which each consists of a continuous series of pulses from which none of the pulses are missing. The time duration of the pulses corresponds to the time duration of the pulses in the signal received from the pulse pattern storage 20.

The marker pulse generaor 24 responds to the signal received via the line 26 to produce a signal which consists of pulses which correspond to the absences of pulses in the signal stored in the pulse pattern storage 20.

Thus the signal device of Fig. 1 is a signal device in which components respond uniquely to a single signal to produce a plurality of different signals. It will hereinafter be shown with greater particularity how apparatus of the invention responds to $x-y$ pulses to give separate signals which contain $x$ and $y$ pulses respectively. Thus only a portion of the signal having $x$ pulses need be stored and the portion which is stored is selected in accordance with the signal which has $y$ pulses.

Figure 2:
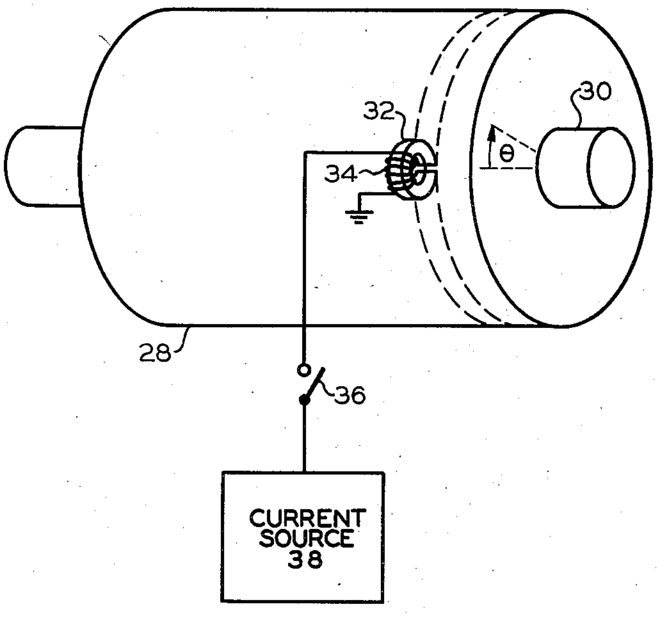
Fig. 2 illustrates apparatus which can be used for performing a method of storing signals in accordance with the invention.

Referring now to the apparatus in Fig. 2, a method will next be described for storing signals in accordance with the invention. The apparatus comprises a magnetic drum 28 supported on an axle 30, a magnetic head 32, a winding 34 thereof, a switch 36 and a current source 38.

The magnetic drum 28 is rotatably supported by the axle 30 and is rotated by a source of rotary power (not shown). The magnetic head 32 is positioned adjacent to the surface of the magnetic drum 28 such that, when the magnetic drum 28 is rotated on the axle 30, the magnetic head 32 scans a peripheral strip of the surface of the magnetic drum 28. A strip scanned by a magnetic head will hereinafter be identified as a "channel."

The current source 38 is coupled via the switch 36 to the winding 34 which is wound on the magnetic head 32. When the switch 36 is closed, current flows through the winding 34 to ground and causes magnetic flux to exist in the magnetic head 32. The magnetic head 32 is constructed so that flux pattern in the magnetic head 32 has fringes which extend into the surface of the magnetic drum 28. These flux fringes establish a magnetic pattern in the surface of the magnetic drum 28.

Thus when the switch 36 is closed, a magnetic pattern is established in the portion of the channel of the magnetic drum 28 which is immediately adjacent to the magnetic head 32. No magnetic pattern is created in the portion of the channel of the magnetic drum 28 which is adjacent to the magnetic head 32 when the switch 36 is open.

For purpose of illustration, it will now be assumed that a pattern of pulses is to be recorded on the magnetic drum 28 by the magnetic head 32 for the purpose of enabling the generation of two signals. The pattern of pulses is to be capable of being responded to for producing one group of signals each having one hundred pulses and a second signal having a single pulse. The pulse pattern therefore consists of ninety-nine pulses. The pulses are recorded in ninety-nine of one hundred equally spaced positions in the channel scanned by the magnetic head 32. Thus ninety-nine of the positions are each to contain a magnetic recording of a pulse and the one-hundredth position is to have no pulse recorded therein.

For the purpose of accurately spacing the recordings of the pulses, the magnetic drum 28 is mounted on a dividing head (not shown). With the magnetic drum arbitrarily positioned in respect to the magnetic head 32, the switch 36 is closed such that a pulse of current occurs through the winding 34. The magnetic head 32 causes a magnetic pattern to be formed in the adjacent portion of the magnetic drum 28. The switch 36 is then opened and the magnetic drum is rotated 3.6° (360° divided by 100) upon the axle 30. A second pulse is then recorded upon the magnetic drum 28. The magnetic drum 28 is rotated another 3.6° and a third pulse is recorded. Ninety-nine sequential pulses are recorded in this fashion and, in the final position, switch 36 is left open and thus the magnetic pattern is absent from the one-hundredth position on the magnetic drum 28. (Alternatively, the magnetic pattern can be simply reversed in the one-hundredth position.)

The magnetic pattern which has been established in the channel of magnetic drum 28 will cause, when the magnetic drum is rotated continuously upon the axle 30, ninety-nine sequential pulses to be generated in the winding 34 followed by the absence of a pulse where a one-hundredth pulse might occur. Thus, an electrical signal has been stored in magnetic form upon the magnetic drum 28 and, as will be shown, is of a form which can be responded to in accordance with the invention to provide a plurality of signals.

Referring now to the signal device shown in detail in Fig. 3, apparatus will next be described which functions to respond to a single electrical signal by producing a plurality of different signals. One of the signals produced will consist of one hundred sequential pulses (none of the pulses being absent) and another of the signals will consist of a single pulse whose occurrence in the signal corresponds to the absence of the pulse in the stored signal.

The apparatus includes (as was shown by block diagram) the pulse pattern storage 20, the clock pulse generator 22 and the marker pulse generator 24. The pulse pattern storage 20 is coupled via the line 26 to the clock pulse generator 22 and the marker pulse generator 24. The clock pulse generator 22 produces signals at the terminals C0, C1, C2 and C3. The marker pulse generator 24 produces a signal at the terminal M.

The pulse pattern storage 20 comprises the magnetic drum 28 rotating on the axle 30, a magnetic head 38, a winding 40, a drum reading amplifier 42 and a cathode follower 44.

The magnetic head 38 scans a channel (represented by the dotted line portion) on the magnetic drum 28. The winding 40 associated with the magnetic head 38 is coupled via the drum reading amplifier 42 to the cathode follower 44. The function of the drum reading amplifier 42 is to amplify the signals produced in the winding 40 by magnetic patterns in the channel of the magnetic drum 28. The drum reading amplifier 42 will hereinafter be described in greater detail.

The cathode follower 44 couples the output terminal of the drum reading amplifier 42 to the line 26. The cathode follower 44 may be a circuit such as illustrated in Electron Tube Circuits (Electrical and Electronic Engineering Series), pages 102–104; section 6–4, The Cathode Follower, first edition, third impression, by Samuel Seely, McGraw-Hill Book Co. The cathode follower 44 functions as an impedance matching device to provide efficient power transfer between the drum reading circuits and the circuits of the clock pulse generator 22 and the marker pulse generator 24.

The clock pulse generator 22 comprises a tuned amplifier 46, a gate 47, pulse amplifiers 48 and 50 and a delay line 52. The tuned amplifier 46 couples the line 26 to the pulse amplifier 48 via gate 47 and the delay line 52 couples the pulse amplifier 48 to the pulse amplifier 50. A disconnecting circuit consisting of unilateral conductors can be inserted between the tuned amplifier 46 and the pulse amplifier 48 to prevent overloading of the tuned amplifier 46.

The tuned amplifier 46 is a circuit such as shown in Fig. 10–1, Electron Tube Circuits by Samuel Seely (cited above in detail). The output circuit of the tuned amplifier consists of a primary and secondary winding of a 1:1 ratio transformer which provides D.-C. isolation. A capacitor is coupled across the secondary winding of the transformer to form a tuned circuit. The frequency for which the tuned amplifier is designed is the frequency at which sequential pulses are read from the magnetic drum 28.

The gate 47 which will hereinafter be described in detail passes the most negative signal which it receives. Consequently, the gate 47 prevents signals which are fed to the pulse amplifier 48 from exceeding ground potential and thus the gate 47 aids in shaping square-wave pulses. Assuming that square-wave pulses are desired as output pulses, the gate 47 can be replaced by any shaping circuit performing the same function.

The pulse amplifiers 48 and 50 are current amplifiers which have an input terminal, a positive output terminal and a negative output terminal. The positive output terminal of the pulse amplifier 48 is coupled to the delay line 52 and to the terminal C2. The negative output terminal of the pulse amplifier 48 is connected to the terminal C0. The positive output terminal of the pulse amplifier 50 is coupled to the terminal C1 and the negative output terminal is coupled to the terminal C3. The input terminals of the pulse amplifiers 48 and 50 receive signals from the gate 47 and the delay line 52 respectively.

When no signal is being fed to the input terminals of the pulse amplifiers 48 and 50, each of these pulse amplifiers produces negative signals at their positive output terminals and positive signals at their negative output terminals. When positive signals are received via the input terminals of one of the pulse amplifiers 48 or 50, the pulse amplifier transmits a positive signal from its positive output terminal and a negative signal from its negative output terminal. Thus, when a pulse amplifier receives a positive input pulse, the pulse amplifier transmits a positive output pulse via its positive output terminal and a negative output pulse via its negative output terminal. The pulse amplifier will hereinafter be described in greater detail and it should be noted that the pulse amplifier responds to a sinusoidal pulse by producing a square-wave output pulse.

The delay line 52 is a delay line of the lumped parameter type which functions to delay a signal for a fixed period of time. In the circuit shown, the delay line 52 functions to delay a signal for a period of time equal to one half of the time duration of a pulse which is read from the magnetic drum 28. Delay lines will hereinafter be described in greater detail.

The marker pulse generator 24 comprises the reshapers 54 and 56, the gates 58 and 60 and the delay line 62. The delay line 62 functions as the delay line 52 except that a delay is provided which is equivalent to one quarter of the time duration of a pulse which is read from the magnetic drum 28.

The reshapers 54 and 56 function to reshape pulses or sine waves and to produce output signals in accordance with timing and shape of signals which are received via clocking terminals. Reshaper 54 comprises the input terminal which is coupled to the line 26, a negative output terminal which is coupled to the gate 58 and a clocking terminal which is coupled to the terminal C2. Any sinusoidally-shaped pulse which is received at the input terminal of the reshaper 54 is shaped and timed in accordance with signals received from the terminal C2 and causes a negative pulse to be transmitted from the negative output terminal to the gate 58.

The reshaper 56 functions in a similar manner and receives input signals from the gate 58. The clocking terminal of the reshaper 56 is coupled to the terminal C1 and signals are transmitted from the reshaper 56 via the terminal M.

While not receiving input pulses, the reshaper 54 transmits a positive signal from its negative output terminal and the reshaper 56 transmits a negative signal from its positive output terminal. The reshapers 54 and 56 will hereinafter be described in greater detail.

The gates 58 and 60 are each crystal diode networks which function as coincidence gates. The gate 58 has three input terminals which are respectively coupled to the negative output terminal of the reshaper 54, the delay line 62 and the terminal C2. When positive signals are coincident at all of the input terminals of the gate 58, the gate 58 passes a positive signal to the reshaper 56. If at any given time an input signal is negative at any one of the input terminals of the gate 58, the gate 58 transmits a negative signal to the reshaper 56.

The gate 60 functions in the manner described for the gate 58 but has only two input terminals. One input terminal of the gate 60 is coupled to the terminal C3 and the second input terminal of the gate 60 is coupled to the terminal C2. When positive signals are simultaneously present at the input terminals of the gate 60, the gate 60 transmits a positive signal to the delay line 62. If at any given time a negative signal is transmitted to the input terminal of the gate 60, the gate 60 transmits a negative signal to the delay line 62. The gates 58 and 60 will hereinafter be described in greater detail.

Figure 3:
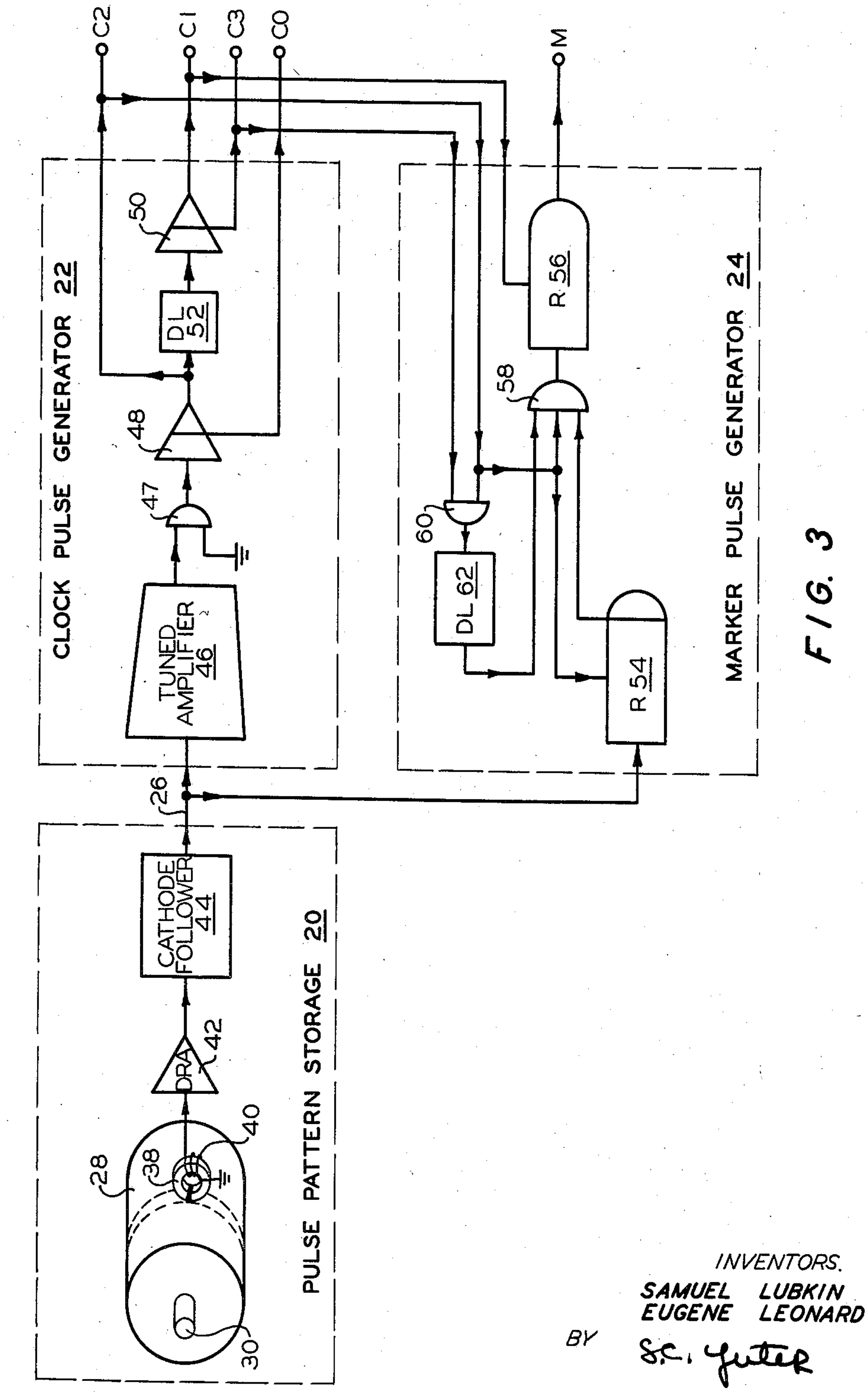
Fig. 3 is a detailed diagram of a signal device in accordance with a preferred embodiment of the invention.
Figure 4:
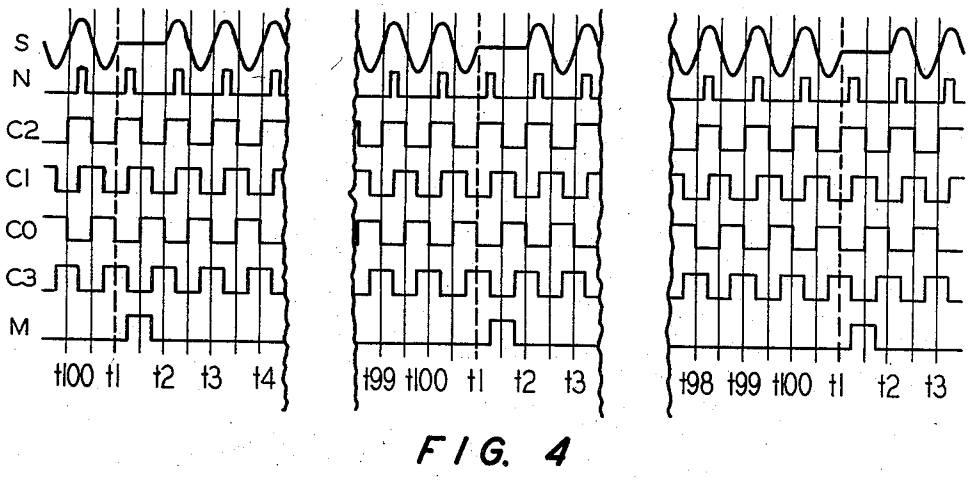
Fig. 4 is a time chart of signals which occur in the apparatus of Fig. 3.

Referring now to the time chart shown in Fig. 4, waveforms of the various signals which occur in the apparatus of Fig. 3 are illustrated. The pulses of the signals are shown as idealized square-wave pulses which have a fifty percent duty cycle. In a constructed model of the signal device, the base voltage of the signals C and M is minus ten volts and the pulses are of such magitude as to reach plus five volts. These potentials are referred to hereinafter as negative and positive signals respectively.

Referring now to Figs. 3 and 4, the operation of the signal device will be shown with reference to the signals on the time chart. Pulses are read from the magnetic drum in the form of sine waves. The signal S having a sine wave absent in every one-hundredth position (the T1 position) is read from the magnetic drum 28 by the magnetic head 38 and the winding 40. The signal stored in the magnetic drum 28 is repeated once for each rotation of the magnetic drum 28 on its axle 30. The signal S is fed via the winding 40 to the drum reading amplifier 42 and is amplified to a suitable magnitude for use in the clock pulse generator 22 and marker pulse generator 24. The cathode follower 44 functions as previously mentioned to match the impedance of the drum reading circuits with the clock pulse generator 22 and the marker pulse generator 24 to provide for efficient power transfer. Thus the signal S is fed via the line 26 to the tuned amplifier 46 and to the reshaper 54.

The output circuit of the tuned amplifier 46, as previously mentioned, resonates at the frequency of the sine wave read from the magnetic drum 28. Thus the output circuit of the tuned amplifier 46 "rings" and causes a wave to be generated for the position from which a wave was absent in the signal S. Thus the signal which is fed from the tuned amplifier to the gate 47 is a signal which corresponds to the signal S except that no sine waves are absent.

The sine waves are converted to square-wave pulses by the gate 47 and the pulse amplifier 48 and the new signal passes to the terminal C2 whose signal output is indicated on the time chart as the signal C2. The signal which appears at the negative output terminal of the pulse amplifier 48 is transmitted to the terminal C0. Because the negative and positive output terminals of the pulse amplifier 48 transmit signals which are of opposite polarities, the pulses which are transmitted by the output terminals of the pulse amplifier 48 are 180° out of phase. This can be seen in the time chart by the phase relationship of the signals C0 and C2.

The signal which is transmitted to the terminal C2 is also transmitted via the delay line 52 to the input terminal of the pulse amplifier 50. The signal is delayed by the delay line 52 and signals of opposite polarity are transmitted respectively via the positive and negative output terminals of the pulse amplifier 50 to the terminals C1 and C3. The signals which result are 180° out of phase with each other and 90° out of phase with the signals which are generated by the pulse amplifier 48.

Signal S, as previously noted, is also fed to the reshaper 54 wherein the signals are reshaped in accordance with the signal C2 and transmitted via the negative output terminal to the gate 58.

Signals C2 and C3 are fed to input terminals of the gate 60. On the time chart it will be noted that the pulses of C2 and C3 co-exist during only one half of the existence of each of the pulses. This causes a narrow pulse to be transmitted by the gate 60 through the delay line 62 and results in the signal N shown on the time chart. N is transmitted to an input terminal of the gate 58. The remaining input terminal of the gate 58 is coupled to the source of the signal C2.

It will be noted that a negative pulse is transmitted by the reshaper 54 each time a sine wave is received via the line 26 and an input terminal of the gate 58 correspondingly becomes negative and prevents the C2 and N pulses from passing to the reshaper 56. When, however, a sine wave is absent in the signal S, the reshaper 54 transmits a positive signal to the input terminal of the gate 58. Thus when the C2 and N signals are coincidentally positive, a positive signal is fed by the gate 58 to the reshaper 56.

In the reshaper 56, the positive pulse is reshaped and retimed in accordance with a pulse of the signal C1 and a positive pulse is transmitted via the terminal M. It will be noted that a positive pulse is transmitted from terminal M only when a pulse is absent from the signal S and that positive pulses of the signal S prevent the transmission of pulses at terminal M.

It has thus been shown how components in the signal device of Fig. 3 respond to the signal stored on the drum 28 by producing a plurality of signals at the terminals C and M, respectively. The signals at the terminals C consist of pulses having the frequency of the pulses of the signal S. There are, however, no pulses absent from the signals produced at the terminals C. The signal at the terminal M consists of a pulse which corresponds to the absence of a positive pulse in the signal S.

It should be noted that the circuitry shown will respond to signals different from signal S. Thus, for example, more pulses (or sine waves) may be absented from the signal S to result in additional pulses in the signal M. If a signal C is to have $x$ number of pulses and signal M to have $y$ number of pulses, it may be generally considered that a signal of $(x-y)$ number of pulses can be processed in accordance with the invention to result in the desired signals C and M.

Figure 5:
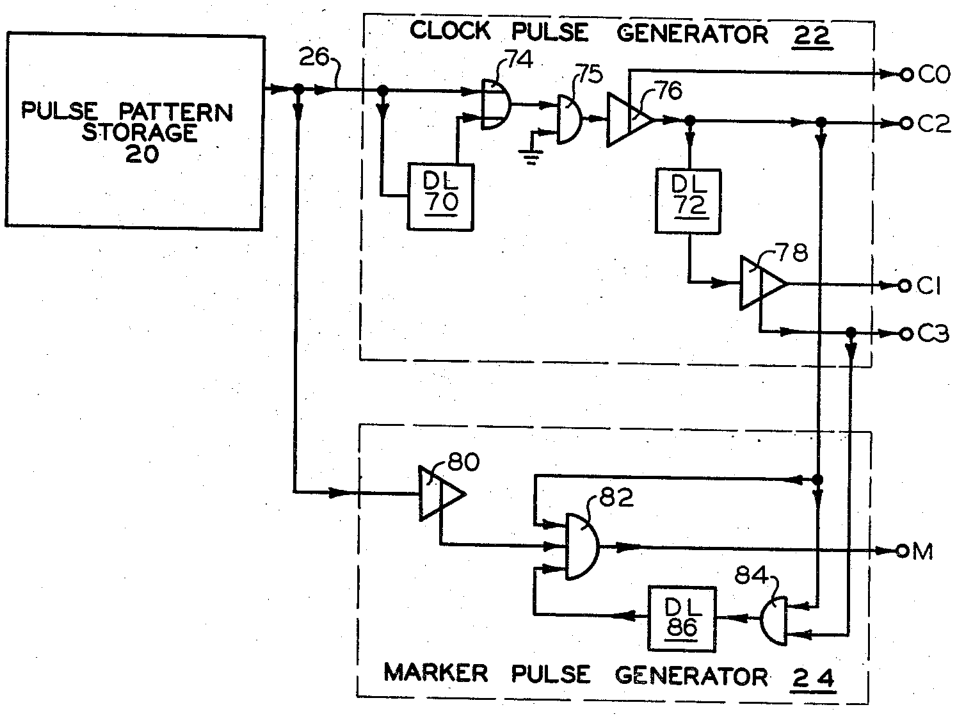
Fig. 5 is a detailed diagram of a second embodiment of the invention.

Referring now to the signal device of Fig. 5, a second embodiment of the invention is shown which responds to a single signal by producing a plurality of output signals. The signal device comprises the pulse pattern storage 20, the clock pulse generator 22 and the marker pulse generator 24. The pulse pattern storage 20 may consist of components such as previously described or may be any other form of storage such as punched paper tape, magnetized wire, a recirculation loop or an electrostatic storage device. The signal which is stored in the pulse pattern storage 20 will be considered to be the same signal previously treated as signal S.

The clock pulse generator 22 comprises delay lines 70 and 72, a buffer 74, a gate 75 and the pulse amplifiers 76 and 78.

The buffer 74 is an "or" gate which comprises a crystal diode network and functions to pass the most positive input signal received. The buffer 74 comprises two input terminals, one of which is connected to the line 26 and the other of which is connected to the delay line 70. When a positive signal is received via either of the input terminals of the buffer 74, the buffer 74 functions to transmit a positive signal. The delay lines 70 and 72 and the pulse amplifiers 76 and 78 function as previously described. The gate 75 functions in the manner described for the gate 47 as a shaping circuit to aid in forming square-wave pulses. Specifically, the delay line 70 provides a delay equal to twice the time duration of a pulse stored in the pulse pattern storage 20 and the delay line 72 provides a delay equal to one-quarter of the duration of a pulse.

The output terminal of the buffer 74 is coupled via the gate 75 to the pulse amplifier 76 whose negative output terminal is coupled to the terminal C0. The positive output terminal of the amplifier 76 is coupled to the terminal C2 and via the delay line 72 to the input terminal of the pulse amplifier 78. The positive output terminal of the pulse amplifier 78 is coupled to the terminal C1 and the negative output terminal of the pulse amplifier 78 is coupled to the terminal C3.

The marker pulse generator 24 comprises the pulse amplifier 80, the gates 82 and 84 and the delay line 86. The input terminals of the gate 84 are coupled to the terminals C2 and C3, and the gate 84 and the delay line 86 function to provide the signal N previously described. The input terminals of the gate 82 are coupled respectively to the terminal C2, to the negative output terminal of the pulse amplifier 80 and to the delay line 86.

In the clock pulse generator 22, because of the delay line 70, each pulse of the signal S causes two sequential pulses to appear at the output terminal of the buffer 74. The buffer 74 therefore transmits a signal from which no pulses are absent. This signal is transmitted via the gate 75 to the pulse amplifier 76 and the signals C0–C3 are generated at the terminals C0–C3 in the manner previously described. The clock pulse generator 22 therefore responds to the signal S by producing signals from which no pulses are absent.

Signal S is also fed via line 26 to the pulse amplifier 80. The pulse amplifier 80 transmits a positive signal to the gate 82 except when a pulse is being received by line 26. Thus neither C2 nor N can pass through the gate 82 when a pulse occurs in the signal S. As a result, a pulse is transmitted via the gate 82 to the terminal M only in accordance with the absence of a pulse in the signal S.

Thus, in accordance with the second embodiment of the invention, a circuit has been provided to respond to a given pulse pattern by producing a plurality of different output signals. For each embodiment of the invention, it has been shown how circuits can be provided to respond to $x-y$ number of pulses by producing signals having $x$ number of pulses and a signal having $y$ number of pulses. It is to be understood that the arrangement of the pulses in the signal S can be varied considerably without departing from the spirit of the invention.

It should further be noted that the principles of the invention are generally applicable to problems which concern signal storage space and which can be solved by storing a plurality of signals as a single signal which can be recreated as the original plurality of signals. The details of the circuit elements will next be described.

*Description of symbols*

The schematic equivalents of the symbols which have been employed to simplify the description of the apparatus are shown in Figs. 6 through 17. For convenient reference, positive and negative supply buses are identified by numbers corresponding with the voltages. Circuit terminals which correspond to symbol terminals are identified by the use of the same character reference numbers.

*Gate*

The gates used in the apparatus are of the "coincidence" type, each comprising a crystal diode network which functions to receive input signals via a plurality of input terminals and to pass the most negative signal.

Figure 6:
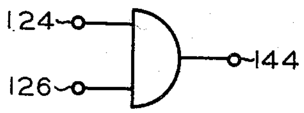
Fig. 6 shows the logical symbol for a gate.

The symbol for a representative gate 122, having two input terminals 124 and 126, is shown in Fig. 6. Since the signal potential levels are plus five volts (positive signals) and minus ten volts (negative signals), the potentials of the signals which may exist at the input terminals 124 and 126 are thereby limited.

If a potential of minus ten volts is present at one or both of the input terminals 124 and 126, a potential of minus ten volts exists at the output terminal 144. Therefore, if one of the input signals to the input terminals 124 and 126 is positive and the other signal is negative, the negative signal is passed and the positive signal is "blocked."

When there is a coincidence of positive signals at the two input terminals 124 and 126, a positive signal is transmitted from the output terminal 144. In such case, it may be stated that a positive signal is "gated" or "passed" by the gate 122.

Figure 7:
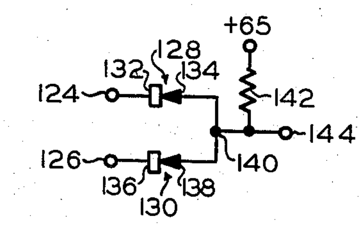
Fig. 7 is a schematic diagram of the circuit illustrated by the symbol of Fig. 6.

The schematic details of the gate 122 are shown in Fig. 7. Gate 122 includes the crystal diodes 128 and 130. Each of the input terminals 124 and 126 is coupled to one of the crystal diodes 128 and 130. Crystal diode 128 comprises the cathode 132 and the anode 134. Crystal diode 130 comprises the anode 138 and the cathode 136. More particularly, the input terminals 124 and 126 are respectively coupled to the cathode 132 of the crystal diode 128 and the cathode 136 of the crystal diode 130. The anode 134 of the crystal diode 128 and the anode 138 of the crystal diode 130 are interconnected at the junction 140. The anodes 134 and 138 are coupled via the resistor 142 to the positive voltage bus 65.

If negative potentials are simultaneously present at the input terminals 124 and 126, both of the crystal diodes 128 and 130 conduct, since the positive supply bus 65 tends to make the anodes 134 and 138 more positive. The voltage at the junction 140 will then be minus ten volts since, while conducting, the anodes 134 and 138 of the crystal diodes 128 and 130 assume the potential of the associated cathodes 132 and 136.

When a positive signal is fed only to the input terminal 124, the cathode 132 is raised to a positive five volts potential and is made more positive than the anode 134, so that crystal diode 128 stops conducting. As a result, the potential at the junction 140 remains at the negative ten volts level. In a similar manner, when a positive signal is only present at the input terminal 126, the voltage at the junction 140 will not be changed.

When the signals present at both input terminals 124 and 126 are positive, the anodes 134 and 138 are raised to approximately the same potential as their associated cathodes 132 and 136 and the potential at the junction 140 rises to a positive potential of five volts.

The potential which exists at the junction 140 is transmitted from the gate 122 via the connected output terminal 144.

In the above described manner, the gate 122 is frequently used as a switch to govern the passage of one signal by the presence of one or more signals which control the operation of the gate 122.

It should be understood that the potentials of plus five volts and minus ten volts used for purpose of illustration are approximate, and the exact potentials will be affected in two ways. First, they will be affected by the value of the resistance 142 and its relation to the impedances of the input circuits connected to the input terminals 124 and 126. Second, they will be affected by the fact that a crystal diode has some resistance (i.e., is not a perfect conductor) when its anode is more positive than its cathode, and furthermore will pass some current (i.e., does not have infinite resistance) when its anode is more negative than its cathode. Nevertheless, the assumption that signal potentials are either plus five or minus ten volts is sufficiently accurate to serve as a basis for the description of the operations taking place in the apparatus.

A clamping diode may be connected to the output terminal 144 to prevent the terminal from becoming more negative than a predetermined voltage level to protect the diodes 128 and 130 against excessive back voltages and to provide the proper voltage levels for succeeding circuits.

*Buffer*

The buffers used in the apparatus are also known as "or" gates. Each buffer comprises a crystal diode network which functions to receive input signals via a plurality of input terminals and to pass the most positive signal.

The symbol for a representative buffer 146, having two input terminals 148 and 150, is shown in Fig. 8. Since the signal potential levels in the system are minus ten volts and plus five volts, either one of these potentials may exist at the input terminals 148 and 150.

If a positive potential of five volts exists at one or both of the input terminals 148 and 150, a positive potential of five volts exists at the output terminal 168. If a negative potential of ten volts is present at both of the input terminals 148 and 150, a negative potential of ten volts will be present at the output terminal 168.

The schematic details of the buffer 146 are shown in Fig. 9. The buffer 146 includes the two crystal diodes 152 and 154. The crystal diode 152 comprises the anode 156 and the cathode 158. Crystal diode 154 comprises the anode 160 and the cathode 162. The anode 156 of the crystal diode 152 is coupled to the input terminal 148. The anode 160 of the crystal diode 154 is coupled to the input terminal 150. The cathodes 158 and 162 of the crystal diodes 152 and 154, respectively, are joined at the junction 164 which is coupled to the output terminal 168, and via the resistor 166 to the negative supply bus 70. The negative supply bus 70 tends to make the cathodes 158 and 162 more negative than the anodes 156 and 160, respectively, causing both crystal diodes 152 and 154 to conduct.

When negative ten volt signals are simultaneously present at input terminals 148 and 150, the crystal diodes 152 and 154 are conductive, and the potential at the cathodes 158 and 162 approaches the magnitude of the potential at the anodes 156 and 160. As a result, a negative potential of ten volts appears at the output terminal 168.

If the potential at one of the input terminals 148 or 150 increases to plus five volts, the potential at the junction 164 approaches the positive five volts level as this voltage is passed through the conducting crystal diode 152 or 154 to which the voltage is applied. The other crystal diode 152 or 154 stops conducting since its anode 156 or 160 becomes more negative than the junction 164. As a result, a positive potential of five volts appears at the output terminal 168.

If positive five volt signals are fed simultaneously to both input terminals 148 and 150, a positive potential of five volts appears at the output terminal 168, since both crystal diodes 152 and 154 will remain conducting. Thus the buffer 146 functions to pass the most positive signal received via the input terminals 148 and 150.

*Delay line*

The symbol for a representative electrical delay line 171 which is a lumped parameter type delay line and which functions to delay received pulses for discrete periods of time, is shown in Fig. 10.

The delay line 171 comprises the input terminal 172, the output terminal 188, and a plurality of taps 180, 182 and 184. A pulse which is fed via the input terminal 172 to the delay line 171 will be delayed for an increasing number of pulse times before successively appearing at the taps 180, 182 and 184. When the pulse reaches the output terminal 188, the total delay provided by the delay line 171 has been applied. In the text which follows, the specific number of pulse-times delay which is encountered before a pulse travels from the input terminal to a tap of the delay line will be stated.

The delay line 171 shown in Fig. 11 comprises a plurality of inductors 176 connected in series, with the associated capacitors 178 which couple a point 174 on each inductor 176 to ground. A signal is fed into the delay line 171 at the input terminal 172 and the maximum delay occurs at the output terminal 188. The taps 180, 182 and 184 are each connected to one of the points 174 and provide varied delays. The delay line 171 is terminated by a resistor 186 in order to prevent reflections. Although in the delay line of Fig. 11 a tap is shown connected to each of the points 174, it should be understood that in actual practice there are ordinarily several untapped points 174 between successive taps.

*Drum reading amplifier*

The symbol for a representative drum reading amplifier 370 is shown in Fig. 12. The drum reading amplifier 370 functions to amplify signals which are generated when the surface of a magnetic drum moves past a magnetic head which is coupled to the input terminal 372 (actually two terminals). The amplified signals appear at the output terminal 374.

As shown in Fig. 13, the drum reading amplifier 370 includes the transformer 376 and the vacuum tubes 384 and 342. The transformer 376 comprises the primary winding 378 connected to the input terminals 372, the secondary winding 380 which couples the control grid 388 of the vacuum tube 384 to ground, and a core 356 provided with an electrostatic shield which is connected to ground to prevent noise from being fed to the control grid 388. The resistor 382 is in parallel with the secondary winding 380. The vacuum tube 384 also includes the anode 386 which is connected via the resistor 394 to the positive supply bus 250, and the cathode 390 connected via the resistor 392 to ground.

The vacuum tube 342 comprises the anode 344 connected via the resistor 350 to the positive supply bus 250, the control grid 346 connected via the resistor 354 to the negative supply bus 1, and the cathode 348 connected to ground. The anode 386 of the vacuum tube 384 is coupled via the capacitor 396 to the control grid 346 of the vacuum tube 342. The anode 344 of the vacuum tube 342 is connected via the capacitor 352 to the output terminal 374.

When a signal is read from the drum by the magnetic head, it is applied to the primary winding 378 of the transformer 376, the secondary winding 380 of the transformer 376 applies an amplified signal to the control grid 388 of the vacuum tube 384. The signal is amplified by vacuum tubes 384 and 342 to produce an amplified signal at the output terminal 374.

*Pulse amplifier*

The symbol for a representative pulse amplifier is shown in Fig. 14. When a positive pulse or positive portion of a sine wave is fed to the pulse amplifier 190 via the input terminal 192, the pulse amplifier 190 functions to transmit a positive pulse which swings from minus ten to plus five volts from its positive output terminal 224, and a negative pulse which swings from plus five to minus ten volts from its negative output terminal 226. At all other times, the pulse amplifier 190 has a negative potential of ten volts at its positive output terminal 224 and a positive potential of five volts at its negative output terminal 226.

The detailed circuitry of the pulse amplifier 190 is shown in Fig. 15. The pulse amplifier 190 includes the vacuum tube 208, the pulse transformer 216 and associated circuitry. The vacuum tube 208 comprises the cathode 214, the grid 212 and the anode 210. The pulse transformer comprises the primary winding 218 and the secondary windings 220 and 222.

The crystal diode 194 couples the grid 212 of the vacuum tube 208 to the input terminal 192, the anode 196 of the crystal diode 194 being coupled to the input terminal 192 and the cathode 198 being coupled to the grid 212. The negative supply bus 70 is coupled to the grid 212 via the resistor 200 and tends to make the crystal diode 194 conductive. The grid 212 and the cathode 198 of the crystal diode 194 are also coupled to the cathode 204 of the crystal diode 202, whose anode 206 is coupled to the negative supply bus 5. The crystal diode 202 clamps the grid 212 at a potential of minus five volts thus preventing the voltage applied to the grid 212 from becoming more negative than minus five volts.

When a voltage more positive than minus five volts is transmitted to the input terminal 192, the crystal diode 194 conducts and the voltage is applied to the grid 212. Since the crystal diode 202 clamps the grid 212 and the cathode 198 of the crystal diode 194 at minus five volts, any voltage more negative than minus five volts will cause the crystal diode 194 to become nonconductive, and that input voltage will be blocked at the crystal diode 194. Thus, the clamping action of the crystal diode 202 will not affect the circuitry which supplies the input voltage.

The cathode 214 of the vacuum tube 208 is connected to ground potential. The anode 210 of the vacuum tube 208 is coupled by the primary winding 218 of the pulse transformer 216 to the positive supply bus 250. The outer ends of the secondary windings 220 and 222 of the pulse transformer 216 are coupled respectively to the positive output terminal 224 and the negative output terminal 226. The inner ends of the secondary windings 220 and 222 are coupled respectively to the negative supply bus 10 and the positive supply bus 5.

A positive pulse which is fed to the grid 212 of the vacuum tube 208 will be inverted at the primary winding 218 of the pulse transformer 216 which is wound to produce a positive pulse in the secondary winding 220 and a negative pulse in the secondary winding 222. These pulses respectively drive the positive output terminal 224 up to a positive five volts potential and the negative output terminal 226 down to a negative ten volts potential because of the circuit parameters.

When the vacuum tube 208 is non-conducting, the negative ten volts potential is fed through the secondary winding 220 and appears at the positive output terminal 224. At the same time, the positive five volts potential is fed through the secondary winding 222 to the negative output terminal 226. These latter conditions are the normally existing conditions at the output terminals 224 and 226.

*Reshaper*

A reshaper is an electronic circuit which functions to reshape and retime positive pulses or to convert sine waves into square-wave pulses.

The symbol for a representative reshaper 228 is illustrated in Fig. 16 and comprises input terminal 230, clock or timing terminal 238 which receives reshaping and retiming pulses (also designated clocking or C pulses), positive output terminal 244 and negative output terminal 246.

Except when positive pulses (inclusive of positive portions of sine waves) are fed to input terminal 230 of the reshaper 228, a negative potential of ten volts is present at the positive output terminal 244 and a positive potential of five volts exists at the negative output terminal 246.

When a positive pulse is fed to the reshaper 228 via input terminal 230, the pulse is reshaped by a clock pulse (received via the terminal 238), which is timed to delay the reshaped pulse for one-quarter of a pulse time, and is then transmitted from the reshaper 228 via the positive output terminal 244. While the positive pulse is being transmitted from the positive output terminal 244, a negative pulse is transmitted from the negative output terminal 246.

The detailed circuitry of the reshaper 228 is illustrated in Fig. 17 in which use is made of logical symbols previously described.

The reshaper 228 comprises the buffer 232, the gate 234 and the pulse amplifier 242 connected in series. A positive pulse which is fed via the input terminal 230 of the buffer 232 is passed to the gate 234.

A series of identical clock pulses which are generated in the clock pulse generator, as has been described in detail, are transmitted to the gate 234 via the clock terminal 238. The clock pulses are equal in magnitude and width to the desired shape and timing of the pulses which are to be reshaped and retimed. The clock pulses are timed so that the starting time of each clock pulse coincides approximately with the center of the pulse it is intended to reshape. This is done to assure that the pulse to be reshaped will have reached its maximum amplitude by the time the leading edge of a clock pulse arrives at the gate 234. Hence, it may be said that a reshaper introduces a one-quarter pulse time delay in the signals passing through it.

When the attenuated positive pulse reaches its full magnitude at the gate 234, the coinciding clock pulse is gated through to the amplifier 242 and is amplified and causes a positive pulse to be transmitted from the positive output terminal 244, and a negative pulse to be transmitted from the negative output terminal 246 at the same time.

The positive output terminal 244 is also coupled to one input of the buffer 232 so that a positive signal which appears at the positive output terminal 244 is regenerative and will continue to exist until the clock pulse terminates at the gate 234. This effectively permits the entire clock pulse to be gated through the gate 234, even though the original pulse has decayed before the end of the clock pulse.

Stated more generally, a clock pulse is passed through the gate 234 from the earliest coincidence of that clock pulse with the full magnitude of the input pulse until the termination of that clock pulse. As a result, a clock pulse is substituted for the input pulse in the system after a delay of one-quarter of a pulse time.

There will now be obvious to those skilled in the art many modifications and variations utilizing the principles set forth and realizing many or all of the objects and advantages of the invention but which do not depart essentially from the spirit of the invention.

What is claimed is:

1. A signal device comprising a source of a pattern of an incomplete series of pulses, the series being incomplete because of the absence of a pulse, a buffer, said buffer having two input terminals, one of said input terminals being directly coupled to said pulse pattern source, a delay line, said delay line coupling the other of said input terminals to said pulse pattern source, said buffer being responsive to the incomplete series of pulses for generating a complete series of pulses and thereby initiating a series of clock pulses, an amplifier coupled to said pulse pattern source and responding to the absence of a pulse in the incomplete series of pulses for transmitting a signal, and a gate coupled to said amplifier for transmitting a signal consisting of a pulse corresponding to each absence of a pulse in the incomplete series of pulses.

2. A signal device comprising a source of a pattern of an incomplete series of pulses, the series being incomplete because of the absence of a pulse, a buffer, said buffer having two input terminals, one of said input terminals being directly coupled to said pulse pattern source, a delay line, said delay line coupling the other of said input terminals of said buffer to said pulse pattern source so that said buffer is responsive to the incomplete series of pulses for generating a complete series of pulses, a clock pulse circuit coupled to said buffer and responsive to said complete series of pulses for transmitting a series of clock pulses, an amplifier coupled to said pulse pattern source and responding to the absence of a pulse in the incomplete series of pulses for transmitting a signal, and a gate coupled to said clock pulse circuit and said amplifier for transmitting a signal consisting of a pulse corresponding to each absence of a pulse in the incomplete series of pulses.

3. A signal device comprising a rotating magnetic drum, said magnetic drum having recorded thereon a pulse pattern consisting of incomplete series of pulses, reading means for reading a signal from said magnetic drum, a tuned amplifier coupled to said reading means and responsive to the signal for completing the series of pulses, a clock pulse circuit coupled to said tuned amplifier for providing a series of clock pulses, a reshaper coupled to said reading means and being responsive to the signal from said magnetic drum for transmitting a signal in response to the absence of a pulse in the incomplete series of pulses and a gate responsive to said source of clock pulses and said reshaper for transmitting a pulse which corresponds to the absence of a pulse in the incomplete series of pulses.

4. A signal device comprising a rotating magnetic drum, said magnetic drum having recorded thereon a pulse pattern consisting of incomplete series of pulses, a magnetic head for reading the pulses from said magnetic drum, an amplifier for amplifying the signal read by said magnetic head, a cathode follower coupled to said drum reading amplifier, a tuned amplifier coupled to said cathode follower and responsive to the amplified signal for completing the series of pulses, a clock pulse circuit coupled to said tuned amplifier for providing a series of clock pulses, a reshaper coupled to said cathode follower and being responsive to the signal amplified by said amplifier for transmitting a blocking signal in response to the presence of a pulse and for transmitting a permitting signal in the absence of a pulse in the incomplete series of pulses, and a gate responsive to said source of clock pulses and said reshaper for transmitting a pulse which corresponds to the absence of a pulse in the incomplete series of pulses.

5. A signal device for producing a pair of pulse signals from an incomplete train of pulses having not more than one pulse omitted in any three consecutive pulse positions, said device comprising a tuned amplifier responsive to said incomplete train of pulses to generate a continuous signal having the same frequency as the pulses of said incomplete train, pulse forming means controlled by said tuned amplifier output signal to form a complete train of pulses at the pulse repetition rate of said train of pulses, and a pulse generator controlled by the output train of pulses and by said incomplete train of pulses to generate a pulse for each omitted pulse in said incomplete train of pulses.

6. A signal generating device for producing a pair of pulse signals from an input train of equi-spaced pulses having at least one pulse in any two consecutive pulse positions, said device comprising a pulse restoration device controlled by said train of equi-spaced pulses to generate a pulse for each pulse position of said input train, a first pulse shaping device responsive to the output of said pulse restoration device to generate an output pulse at each pulse position of said train of equi-spaced pulses, a signal inverter responsive to said input train pulses to generate a signal complementary to said input pulse train and a second pulse shaping device controlled by the output pulses of said first pulse shaping device and by said complementary signal to produce a pulse for each pulse omitted in said input pulse train.

References Cited in the file of this patent

UNITED STATES PATENTS 2,594,731 Connolly ------------ Apr. 29, 1952